United States Patent
Yang et al.

(12)

(10) Patent No.: US 10,219,301 B2
(45) Date of Patent: Feb. 26, 2019

(54) INHIBITION MECHANISM FOR DEVICE-TO-DEVICE (D2D) COMMUNICATION

(71) Applicant: NOKIA SOLUTIONS AND NETWORKS OY, Espoo (FI)

(72) Inventors: Weidong Yang, San Diego, CA (US); Lars Erik Lindh, Helsinki (FI); Zexian Li, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 44 days.

(21) Appl. No.: 15/501,545

(22) PCT Filed: Aug. 6, 2014

(86) PCT No.: PCT/US2014/049899
§ 371 (c)(1),
(2) Date: Feb. 3, 2017

(87) PCT Pub. No.: WO2016/022110
PCT Pub. Date: Feb. 11, 2016

(65) Prior Publication Data
US 2017/0231007 A1    Aug. 10, 2017

(51) Int. Cl.
*H04W 74/08*     (2009.01)
*H04W 74/00*     (2009.01)
*H04W 76/14*     (2018.01)

(52) U.S. Cl.
CPC ..... *H04W 74/0816* (2013.01); *H04W 74/006* (2013.01); *H04W 76/14* (2018.02)

(58) Field of Classification Search
CPC ........... H04W 74/0816; H04W 74/006; H04W 74/0841; H04W 76/023; H04W 72/1242; H04L 12/413; H04L 51/26
See application file for complete search history.

(56) References Cited

U.S. PATENT DOCUMENTS

2002/0126692 A1* 9/2002 Haartsen ............... H04W 72/10
370/450
2009/0180492 A1 7/2009 Hu et al.
(Continued)

FOREIGN PATENT DOCUMENTS

WO     2016022110 A1    2/2016

OTHER PUBLICATIONS

3GPP, "D2D Communication Resource Scheduling", TSG-RAN WG2 Meetin\t #85, Feb. 10-14, 2014, 5 pages.
(Continued)

*Primary Examiner* — Warner Wong
(74) *Attorney, Agent, or Firm* — Brake Hughes Bellermann LLP

(57) ABSTRACT

An example method includes generating, by a first user device, a first number representing a contention resolution priority for the first user device contending for at least one first resource over a first data period for transmitting a packet of data in a device-to-device (D2D) wireless network, determining if a second device, in the D2D wireless network, is contending for resources overlapping with the at least one first resource of the first data period, if the second device is contending for resources overlapping with the at least one first resource of the first data period, determining if a second number representing a contention resolution priority for the second user device is greater than the first number, and if the second number is greater than the first number, inhibiting the first user device from communicating using the at least one first resource of the first data period.

16 Claims, 13 Drawing Sheets

(56) References Cited

U.S. PATENT DOCUMENTS

| | | | | |
|---|---|---|---|---|
| 2011/0085494 | A1* | 4/2011 | Ji | H04W 40/12 |
| | | | | 370/328 |
| 2015/0372717 | A1* | 12/2015 | Schrum, Jr. | H04B 3/542 |
| | | | | 370/458 |
| 2016/0165624 | A1* | 6/2016 | Benveniste | H04L 47/10 |
| | | | | 370/230 |
| 2016/0302215 | A1* | 10/2016 | Sorrentino | H04W 76/14 |

OTHER PUBLICATIONS

3GPP, "D2D Communication without network coverage", TSG-RAN WG1 Meeting #74bis, Oct. 7-11, 2013, 5 pages.
3GPP, "Mode 2 resource allocation for D2D broadcast communication", TSG RAN WG1 Meeting #77, May 19-23, 2014, 6 pages.
PCT/US2014/049899, "International Search Report and Written Opinion Received", dated May 27, 2015, 14 pages.
International Preliminary Report on Patentability for PCT Application PCT/US2014/049899, dated Feb. 16, 2017, 9 pages.

* cited by examiner

| ID | RI | BW | FR | FH | TA | RPT | CR | CRC |

|  |  | Talk 1 | | | | | Talk 2 | | | | |
| --- | --- | --- | --- | --- | --- | --- | --- | --- | --- | --- | --- |
|  |  | SA Period | | | Data Period | | SA Period | | | Data Period | |
|  |  | CRO1 | CRO2 | CRO3 |  |  | CRO1 | CRO2 | CRO3 |  |  |
| UE1 |  | SA1, 768 | SA1, 768 | SA1, 768 | Start Talking |  | SA1, 352 |  |  |  |  |
| UE2 |  |  | SA2, 500 |  |  |  | SA2, 600 | SA2, 600 |  |  |  |
| UE3 |  | SA3, 100 |  |  |  |  |  | SA3, 701 | SA3, 701 | Start Talking |  |

Silence

FIG. 7A

|  |  | Talk 1 | | | | | Talk 2 | | | | |
| --- | --- | --- | --- | --- | --- | --- | --- | --- | --- | --- | --- |
|  |  | SA Period | | | Data Period | | SA Period | | | Data Period | |
|  |  | CRO1 | CRO2 | CRO3 |  |  | CRO1 | CRO2 | CRO3 |  |  |
| UE1 |  | SA1, 768 | SA1, 768 |  |  |  | SA1, 352 |  |  |  |  |
| UE2 |  |  |  |  |  |  | SA2, 600 | SA2, 600 |  |  |  |
| UE3 |  | SA3, 100 |  |  |  |  |  | SA3, 701 | SA3, 701 | Start Talking |  |
| Fire Chief |  |  | SA4, 801 | SA4, 801 | Start Talking |  |  |  |  |  |  |

Silence

FIG. 7B

|  |  | Talk 1 ||||  | Talk 2 ||||
|  |  | SA Period || Data Period ||  | SA Period || Data Period ||
|  |  | CRO1 | CRO2 | CRO3 |  |  | CRO1 | CRO2 | CRO3 |  |  |
| UE1 |  | SA1, 768 | SA1, 768 |  |  |  | SA1, 352 |  |  |  |  |
| UE2 |  |  |  |  |  |  | SA2, 600 | SA2, 600 |  |  |  |
| UE3 |  | SA3, 100 |  |  |  |  |  | SA3, 701 | SA3, 701 | Start Talking ||
| Fire Chief |  |  | SA-HP, 801 | SA-HP, 801 | Start Talking ||  |  |  |  |  |

Silence

FIG. 7C

INHIBITION MECHANISM FOR DEVICE-TO-DEVICE (D2D) COMMUNICATION

This application is a national stage entry of PCT Application No. PCT/US2014/049899, filed Aug. 6, 2014, entitled "INHIBITION MECHANISMS FOR DEVICE-TO-DEVICE (D2D) COMMUNICATION" which is hereby incorporated by reference in its entirety.

TECHNICAL FIELD

This description relates to wireless networks.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations, which are referred to as enhanced Node Bs (eNBs), provide wireless access within a coverage area or cell. In LTE, mobile devices, or mobile stations are referred to as user equipments (UE). LTE has included a number of improvements or developments.

SUMMARY

In one example embodiment, a method includes generating, by a first user device, a first number representing a contention resolution priority for the first user device contending for at least one first resource over a first data period for transmitting a packet of data in a device-to-device (D2D) wireless network, determining if a second device, in the D2D wireless network, is contending for resources overlapping with the at least one first resource of the first data period, if the second device is contending for resources overlapping with the at least one first resource of the first data period, determining if a second number representing a contention resolution priority for the second user device is greater than the first number, and if the second number is greater than the first number, inhibiting the first user device from communicating using the at least one first resource of the first data period.

In another example embodiment, a user device includes at least one processor and at least one memory including computer instructions, when executed by the at least one processor, cause the user device to generate a first number representing a contention resolution priority for the user device contending for at least one first resource over a first data period for transmitting a packet of data in a device-to-device (D2D) wireless network, determine if another user device, in the D2D wireless network, is contending for resources overlapping with the at least one first resource of the first data period, if the another device is contending for resources overlapping with the at least one first resource of the first data period, determine if a second number representing a contention resolution priority for the another user device is greater than the first number, and if the second number is greater than the first number, inhibiting the user device from communicating using the at least one first resource of the first data period.

In yet another example embodiment, a user device includes at least one processor and at least one memory including computer instructions, when executed by the at least one processor, cause the user device to generate a first number representing a contention resolution priority for the user device contending for at least one first resource over a first data period for transmitting a packet of data in a device-to-device (D2D) wireless network, and inhibiting the user device from communicating using the at least one first resource of the first data period, if a second number representing a contention resolution priority for another user device is greater than the first number.

The details of one or more examples of implementations are set forth in the accompanying drawings and the description below. Other features will be apparent from the description and drawings, and from the claims.

BRIEF DESCRIPTION OF THE DRAWINGS

FIG. 5 is a block diagram of a scheduling packet according to at least one example implementation.

FIGS. 7A, 7B and 7C are tables illustrating resource assignment according to at least one example implementation.

DETAILED DESCRIPTION

Various example implementations are provided to improve efficiency of wireless resource usage such as in a device-to-device (D2D) or proximity service (ProSe) wireless network. UE's in the D2D wireless network individually requesting resources or selecting the resource in an autonomous way (i.e. no central control unit), which can lead to contention amongst UEs possibly leading to collisions. According to an example implementation, a technique may include providing a contention-resolving mechanism such that priorities are used to determine a UE that will transmit. The contention mechanism includes (e.g., prior to data transmission) the UE transmits a randomly generated number in, as one example, a contention resolution field in a scheduling assignment (SA). This number randomly assigns a priority to the data the UE wishes to transmit. Each UE in the D2D wireless network reads the contention resolution fields of SAs from other UEs. The UE is stopped from transmitting the data if the time-frequency resources used by the UE overlap with the resources of another UE and the UE's randomly assigned priority is lower than that of another UE. In other words, a UE compares its own generated number with generated numbers from other UEs (which have overlapped resource) and does not transmit data (or voice) if any generated number is greater that the UE's generated number. Further, in the event that the UE does not transmit, the UE may generate a new number for a future (e.g., next transmission timeslot) attempt. Alternatively, if a UE (UE1) does not succeed in obtaining the right to transmit in the current contention resolution, the UE waits until the winning UE from the current resolution finishes its talk burst for another occasion to trigger the UE1 to transmit SA. In another words, a UE can either randomly generate the number for each SA period, or the UE can generate the random number once at a SA period and when a trigger condition is met.

Figure 1:
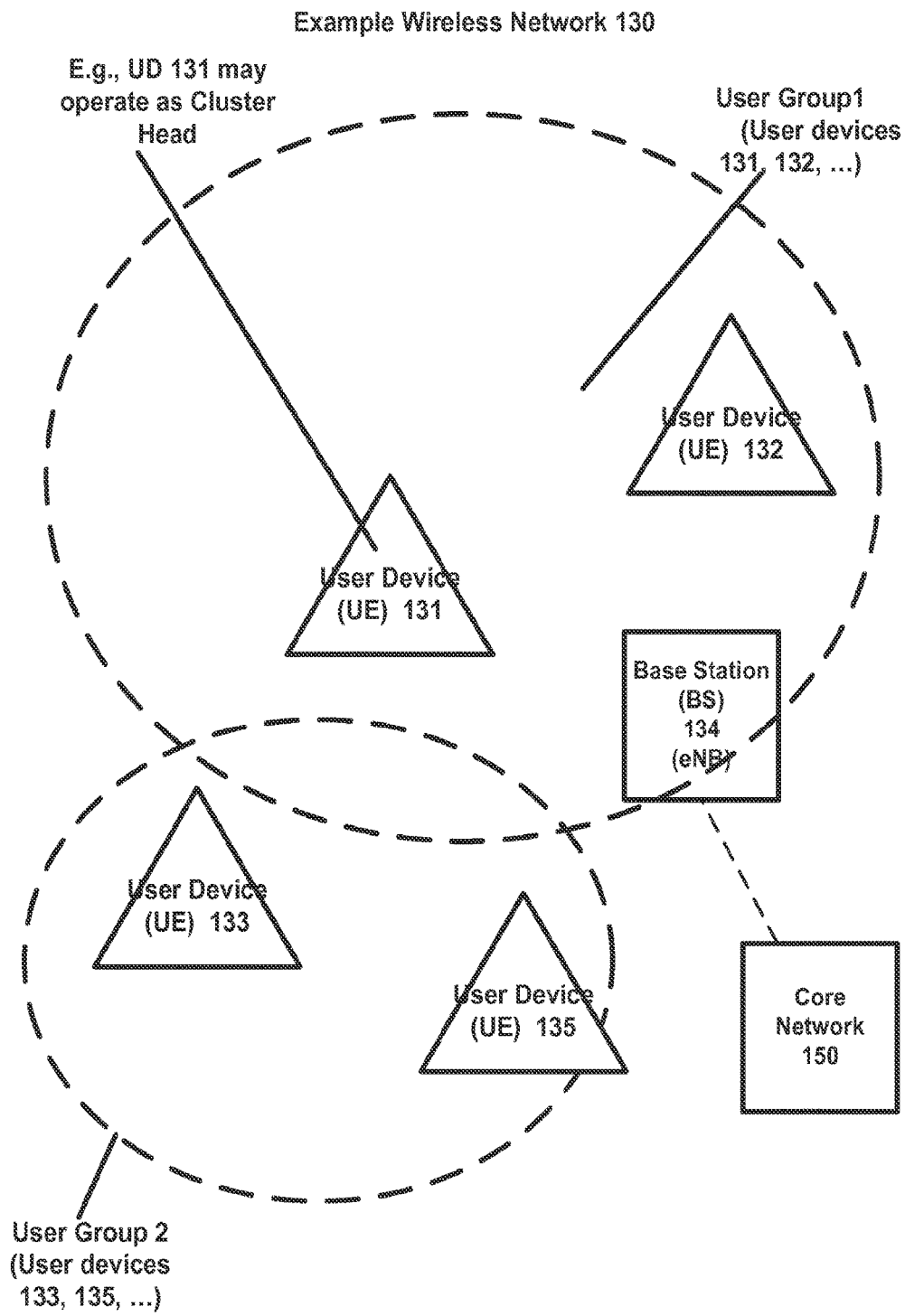
FIG. 1 is a block diagram of a wireless network according to at least one example implementation.

FIG. 1 is a block diagram of a wireless network 130 according to an example implementation. In the wireless network 130 of FIG. 1, user devices 131, 132, 133 and 135, which may also be referred to as user equipments (UEs), may be connected (and in communication) with a base station (BS) 134, which may also be referred to as an enhanced Node B (eNB). At least part of the functionalities of a base station or (e) Node B may be also carried out by any node, server or host which may be operably coupled to a transceiver, such as a remote radio head. BS 134 provides wireless coverage within a cell 136. Although only four user devices are shown within cell 136 (which may or may not be connected or attached to BS 134), any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station, a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE, core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

According to an example implementation, user devices 131,132, 133 and 135 may be in proximity to each other. User device 131 and 132 may be part of user group 1, while user devices 133 and 135 may be part of user group 2. However, example embodiments are not limited thereto. For example, user devices 131, 132, 133 and 135 may be associated with one user group. In one example implementation, one of the user devices, such as user device 131 may also operate as a multi-user group cluster head. However, the user devices 131, 132, 133 and 135 may operate together in a D2D wireless network without the use of a group cluster head. A cluster head may transmit synchronization signals, and may also transmit a channel occupation (or channel occupancy) information for one or more channels including, for each channel, identifying whether the channel is free or occupied, and identify the user group that is occupying the channel and/or the user device ID of the user device that is occupying the channel if the channel is occupied, for example.

According to an example implementation, the user devices of user group 1 may operate in a device-to-device (D2D) mode in which user devices may directly communicate with each other. Similarly, the user devices for user group 2 may also operate in a D2D mode. Thus, in a D2D mode, communications may occur directly between user devices, rather than passing through BS 134, for example. However, user devices 131, 132, 133 and 135 may be associated with one user group while in a D2D mode. D2D communications may be performed, for example, in the event of a breakage of S1 interface 151 or other network failure. Alternatively, a user group may be established and the user devices of such user group may perform D2D communications even when no such network failure has occurred, such as, for example, to offload traffic from the network (BS 134 and core network 150) and/or to allow user devices to communicate directly in a D2D mode.

According to an example implementation, one or more semi-persistent resources (e.g., wireless channel(s)) may be allocated, or made available for use, by the various user groups, including user group 1 and user group 2. Such resource or channel allocation may be considered persistent since it may be allocated to or occupied by a user group for an extended period of time (e.g., minutes) and does not typically expire, for example. Alternatively, there can be dedicated resources pre-configured for D2D usage.

According to an example implementation, multiple user groups may share multiple resources (multiple wireless channels). Furthermore, according to an example implementation, once a channel has been obtained by or is occupied by a user group (or a user within the user group), then user devices within the occupying user group, e.g., when operating in a D2D mode of operation, may use/share the channel up to a group channel holding period. Also, within a group channel holding period for a channel, user devices within an occupying user group (that occupies the channel) may hold or occupy the channel up to a user channel holding period. A group channel holding period (e.g., minutes) may be much longer than a user channel holding period (e.g., tens or hundreds or milliseconds). Therefore, according to an example implementation, once a user device obtains a free or available channel, the user device obtains the channel for itself (up to a user channel holding period) and also obtains the channel on behalf of (or for) its user group (e.g., allowing users of that user group to occupy or hold the channel up to a group channel holding period). Because of the shared nature of such resource or channel, when one user device is transmitting, 1 or more (or even all) of the other user devices within the same user group and even other user devices within other user groups may receive the transmitted signal via the shared channel. Thus, such a transmission may be considered as a broadcast transmission, or a 1:M transmission in the D2D mode.

According to one example implementation, a distributed resource allocation technique may be used, where user devices may contend for the right to occupy or hold the channel. A variety of distributed resource access techniques may be used, such as contention-based access techniques where user devices contend for the right to control the channel or the right to transmit on the channel. One example of a distributed resource access technique that may be used may include a Carrier Sense Multiple Access (CSMA) technique in which a node or user device first senses the channel or medium to determine if another node or user device is transmitting. If the channel is idle, the user device may begin transmitting. If the channel or medium is busy, the user device waits for the channel to become idle.

Figure 2:
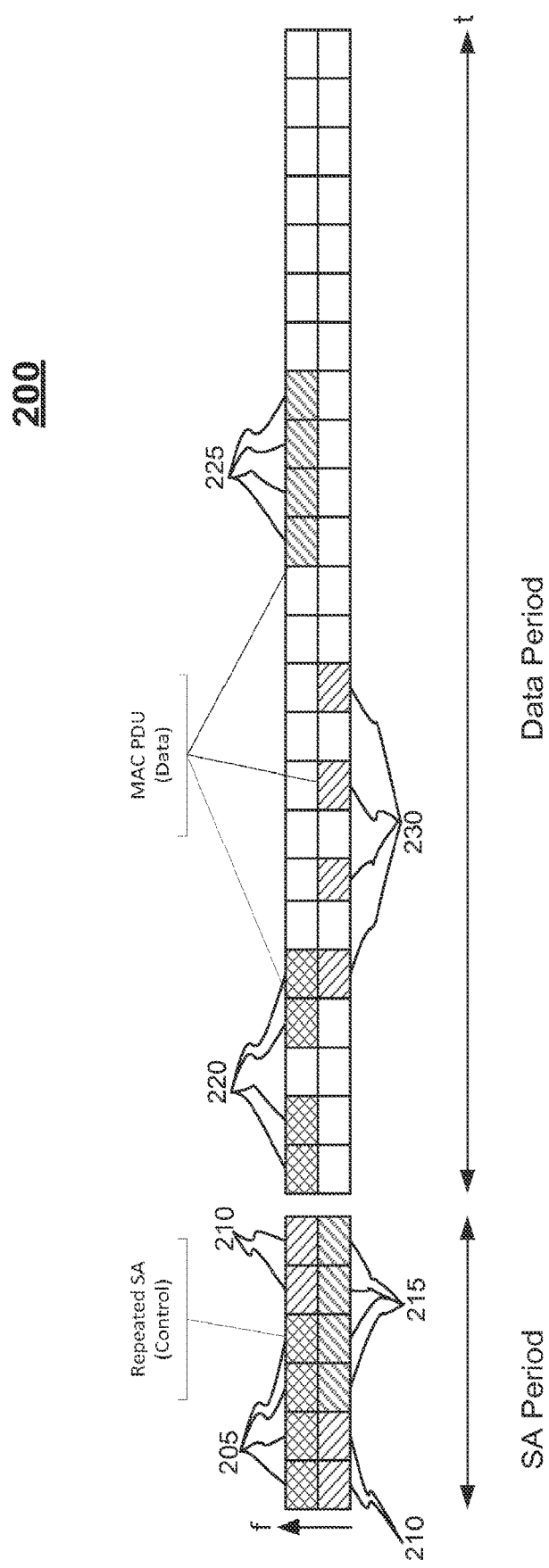
FIG. 2 is a block diagram illustrating a time-frequency structure (frame or subframe) for control and data communications in a device-to-device (D2D) wireless network.

FIG. 2 is a block diagram illustrating a time-frequency structure (frame or subframe) for control and data communications in a device-to-device (D2D) wireless network. As shown in the time-frequency structure (frame or subframe) for control and data communications 200 (hereinafter referred to as subframe 200) has an associated scheduling assignment (SA) period and data period. The SA period and the data period may be communicated sequential in time. In other words, although FIG. 2 shows the data period following the SA period, example embodiments may include other time relationships between the data period and the SA period. Each of the SA period and data period may include a plurality of associated frequencies for communication (only two are shown). Although in FIG. 2 the Data Period is coming after SA Period, it should be noted that the SA subframes and data subframes can be interleaved as well.

Each block in the data period may represent a physical resource block (PRB) or time-frequency resource or resource (herein after referred to as a resource). When a resource is used to communicate data, the resource may also carry a protocol data unit (PDU) or medium access control (MAC) PDU (MAC PDU). A PDU can be repeated according to some rules on several subframes for better reliability or coverage. Each SA in the SA period contains a control block used to communicate control signals or packets including information about a user device. The information may be associated with scheduling data transmission using a data resource or contending for a resource. An SA from a user device may be repeated in time so that other user devices in the D2D wireless network can receive the SA and read its contents. According to example implementations, one SA (which can be transmitted several times on different subframes and frequencies in the SA period) schedules all the resources to transmit the PDU and not the individual resources.

FIG. 2 illustrates a number of resources as PDUs. For example, PDU 220, 225 and 210. Each PDU uses four resources. However, example embodiments are not limited thereto. For example, a PDU may use less (e.g., two) or more (e.g., six) resources. For example, as is shown, the resources associated with PDU 220 correspond with SA 205 (four blocks), the resources associated with PDU 225 correspond with SA 210 (four blocks), and the resources associated with PDU 230 correspond with SA 215 (four blocks). Although four identical repeated SAs are shown as being used to schedule four resources representing one PDU, example embodiments are not limited thereto. For example, one SA could be used to schedule four resources (e.g., as a pattern of resources) or four SAs could be used to schedule one resource. A PDU may use contiguous (or sequential in time) resources (e.g., PDU 225) or resources spread over discontinuous resources (e.g., PDU 220, 225). In an example implementation, there may be a table of selected patterns defining the resources for a PDU. In contention based scheduling, each UE can select one pattern for the transmission of a PDU.

In D2D communications, two modes are defined, Mode 1 and Mode 2. To facilitate the scheduling of D2D data transmission, a D2D control channel configured to signal (e.g., a channel over which a control message is communicated) a scheduling assignment (SA) is introduced to point to the resource location used for data transmission and indicate other transmission parameters of the D2D data transmission.

Communication Mode 1 is under the control of a base station. In Mode 1, both the SA and D2D data are scheduled by the base station. In this case SA is somewhat similar to PDCCH. One difference could be while PDCCH is transmitted by eNB towards user devices, a SA is transmitted by the transmitting user device for the benefit of other user devices in the D2D network.

Communication Mode 2 can be operated both in in-coverage and out-of-coverage scenarios. In the out-of-coverage case, Mode 2 is not under the control of the base station. In the in-coverage case, parameters in Mode 2 communications may be configured by the base station. One key difference compared to Mode 1 is there is no central controller in Mode 2. The transmission of the SA and/or the D2D data can be subject to collision. For example, the SA can have the bundled functionalities of PRACH and PDCCH.

Figure 3:
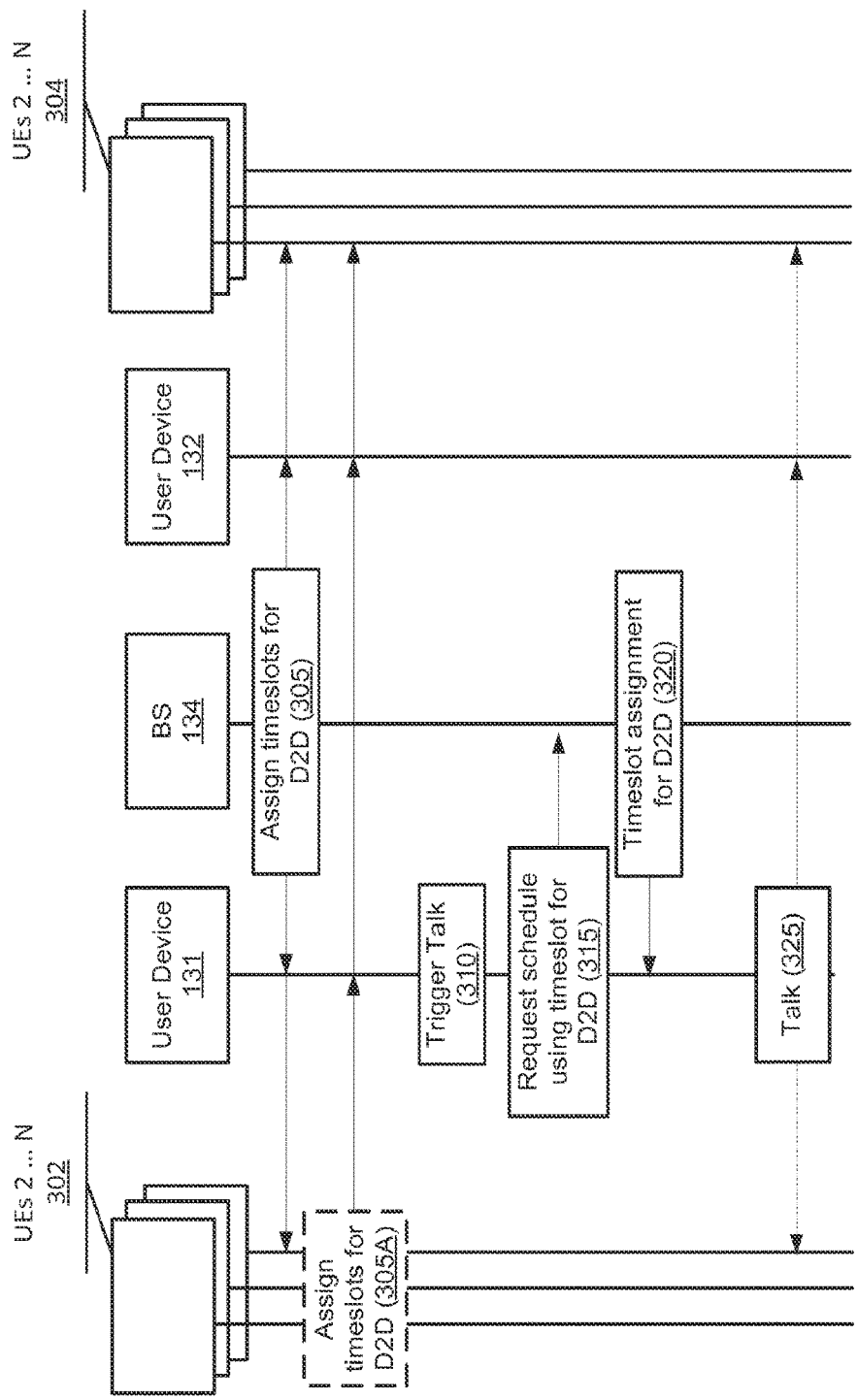
FIG. 3 is a diagram illustrating a technique for D2D communication according to at least one example implementation.

FIG. 3 is a diagram illustrating a technique for device-to-device (D2D) communication according to at least one example implementation. In this example implementation, the associated base station may be configured to allocate the one or more semi-persistent resources (e.g., wireless channel (s)) for use by the various user groups. Such base station resource or channel allocation may be referred to as mode 1 D2D transmission, mode 1 communication and/or communicating in mode 1. In mode 1 communication, base station allocation of resources may be considered persistent, for example, because the resources may be allocated to or occupied by a user group for an extended period of time (e.g., minutes). As shown in FIG. 3, signals, messages and/or data are communicated between one or more of a user device (UE) 131, 132, a base station (BS) 134, and a plurality of user device (UEs) 302, 304. According to example embodiments, the communication of signals, messages and/or data may be described as controlling the sending of a signals, messages and/or data by a controller of a first device (e.g., UE 131 or BS 134) to a second device (e.g., BS 134 or UE 132). The second device then controls the receiving of the signal (message or data) by a controller of the second device.

As shown in FIG. 3, the BS 134 assigns resources for D2D communications (block 305). The resources may include a timeslot and a wireless channel on which to communicate. The resources may be less than all of the resources available to the BS 134. For example, the resources may be split between D2D communications and non-D2D communications. Therefore, a portion of the resources available to the BS 134 may be assigned or allocated for D2D communications. The assigned resources may be signaled to each of the UE's associated with the BS 134. Alternatively, the assigned resources may be signaled to a portion of the UE's associated with the BS 134. For example, the assigned resources may be signaled to a D2D group associated with the BS 134.

Alternatively, as shown in FIG. 3, one of the UEs 302 can, in one implementation, optionally act as a cluster head and assign resources for D2D communications (block 305A). The resources may include a timeslot and a wireless channel on which to communicate. The assigned resources may be signaled to each of (or a portion of) the UE's. For example, the assigned resources may be signaled to a D2D group or broadcast to all UE's in range of the cluster head.

After assignment of resources for D2D communication, there may be some event to trigger communications. For example, a trigger to talk (block 310) may be initiated by UE 131. However, other events may also trigger communications (e.g., sending a text message). The trigger to talk may be initiated by depressing a button on the UE 131. However, other actions may cause a trigger to talk. For example, interaction with a touch screen of the UE 131 to select a receiving UE or group of UE's followed bay selecting a call user interface on the touch screen may initiate a trigger to talk. The UE 131 then requests a schedule (e.g., timeslot for using resources) using one of the assigned timeslots for D2D communication (block 315) via a signal to the BS 134. The BS 134 then assigns a timeslot for D2D communication (block 320) to UE 131 and communicates the assignment to UE 131. Assigning the timeslot may be based on priority. For example, if a plurality of UE's are requesting resources, the UE with the highest priority may be assigned resources first. Assigning the timeslot may be based on a queue. For example, the timeslot may be assigned on a first in first assigned basis. Other assignment mechanisms may also be used.

Finally, the UE 131 talks (block 325) using the allocated timeslot and the assigned resources (e.g., channel). In FIG. 3, UE 131 talks with UE 132 (as illustrated by the solid line). However, UE 132 may talk to a plurality of UE's (including UEs 302, 304) as a broadcast communication (as illustrated by the dotted/dashed lines). Talking may include sending a message including a data packet. The data packet may include voice data or any other type of data (e.g., an image or text). Talking may also include receiving the message (targeted or broadcast) by another user device (e.g., UE 132).

In cellular LTE, except for some cases with non-synchronized RACH, every transmission from a UE is controlled by base station. In Terrestrial Trunked Radio (TETRA), the transmission from a slave terminal is controlled by a master terminal. The contention among slave terminals is arbitrated by the master terminal.

Figure 6A:
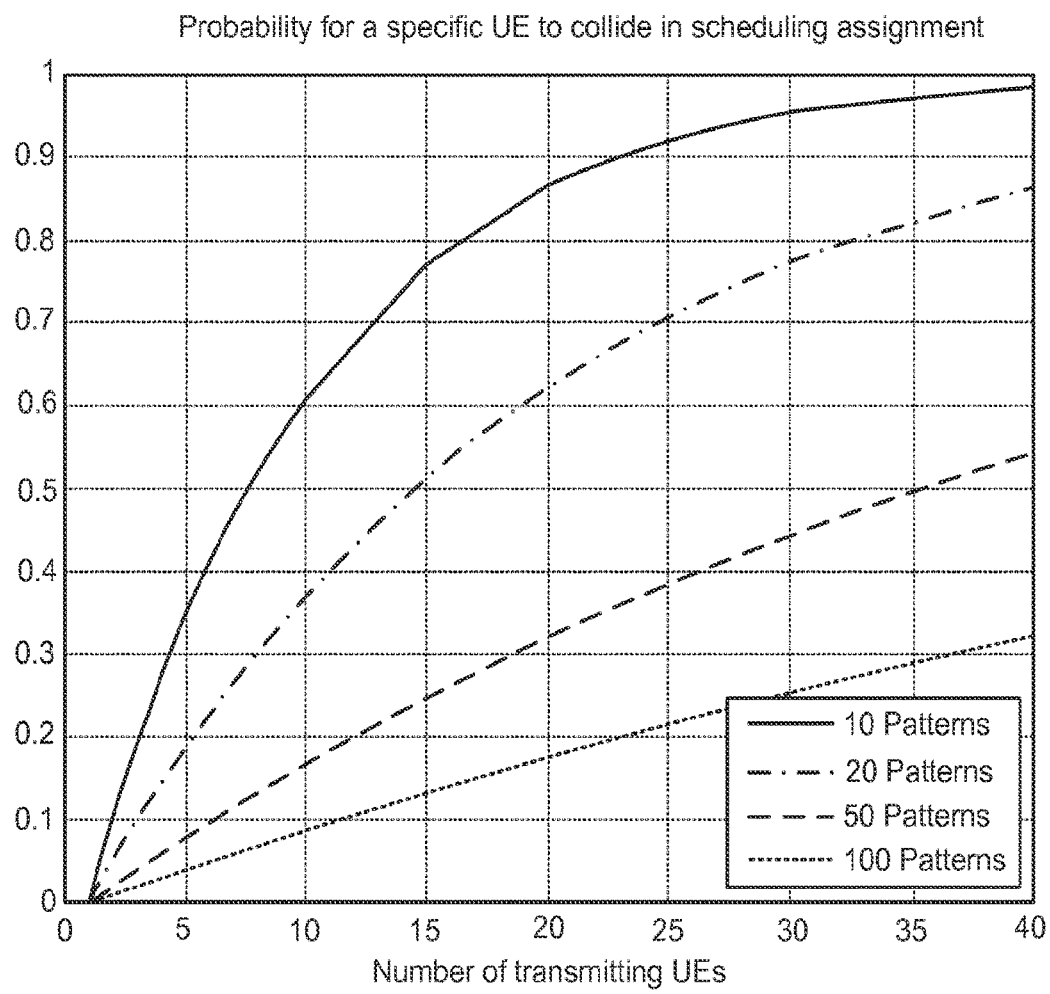
FIGS. 6A and 6B are graphs illustrating collision probabilities for different numbers of patterns and transmitting devices according to at least one example implementation.
Figure 6B:
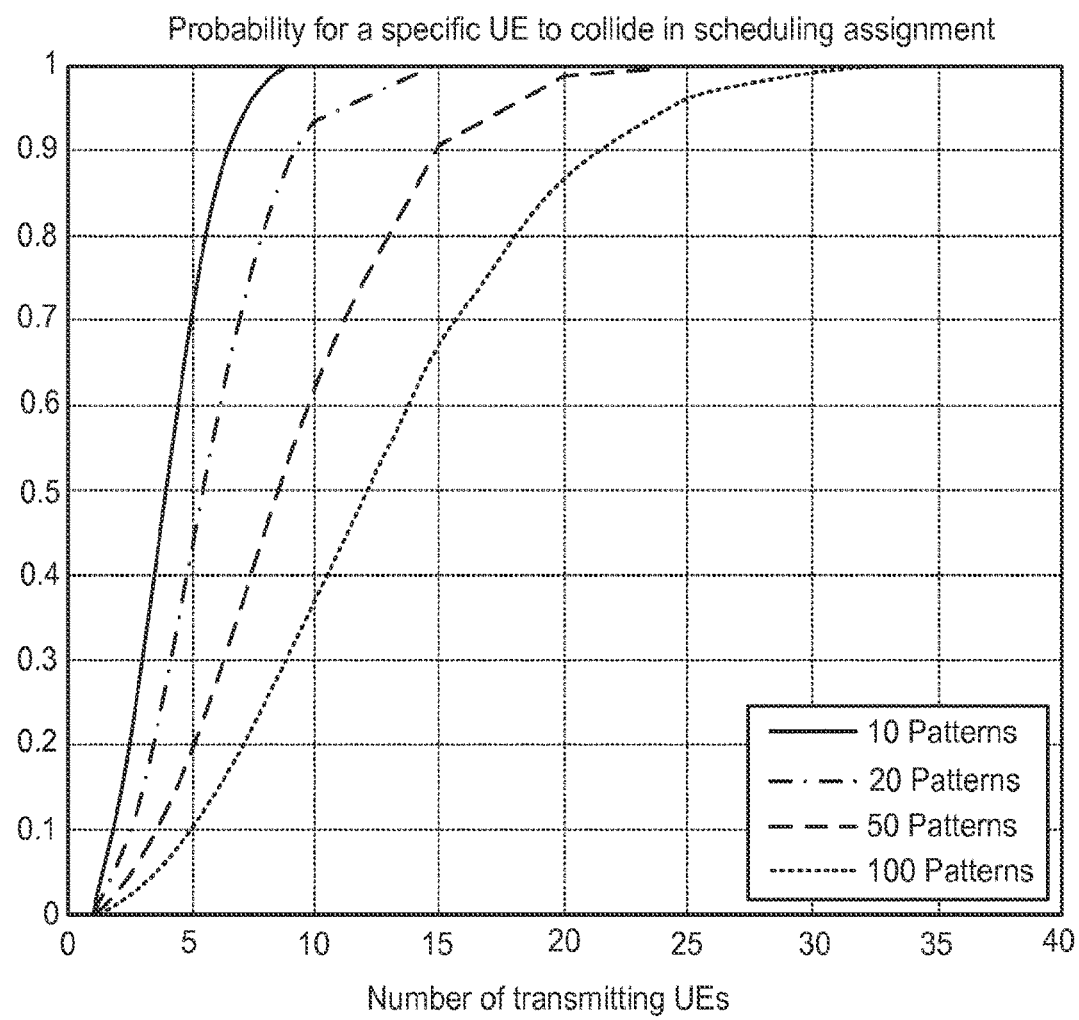

In LTE D2D communications (e.g., mode 2), to avoid the single point failure, there is no master terminal or cluster head to control or allocate the radio resources for other user devices. Hence contention among user devices can be a problem or have detrimental effects. If each user device is allowed to transmit freely without any coordination, then the required SA resources to achieve a low enough collision probability among user devices can be quite large as illustrated by the probability for a specific user device to collide in scheduling assignment versus a number of transmitting user devices shown in the in the graphs of FIGS. 6A and 6B. In addition for public safety scenarios, it is required a high priority call can preempt lower priority calls.

Mode 1 communication (as described with regard to FIG. 3) may function properly (e.g., schedule user devices) with a BS managing the scheduling. However, wireless D2D communications should be completely functional even if a BS is unavailable (e.g., does not exist or is damaged).

Figure 4:
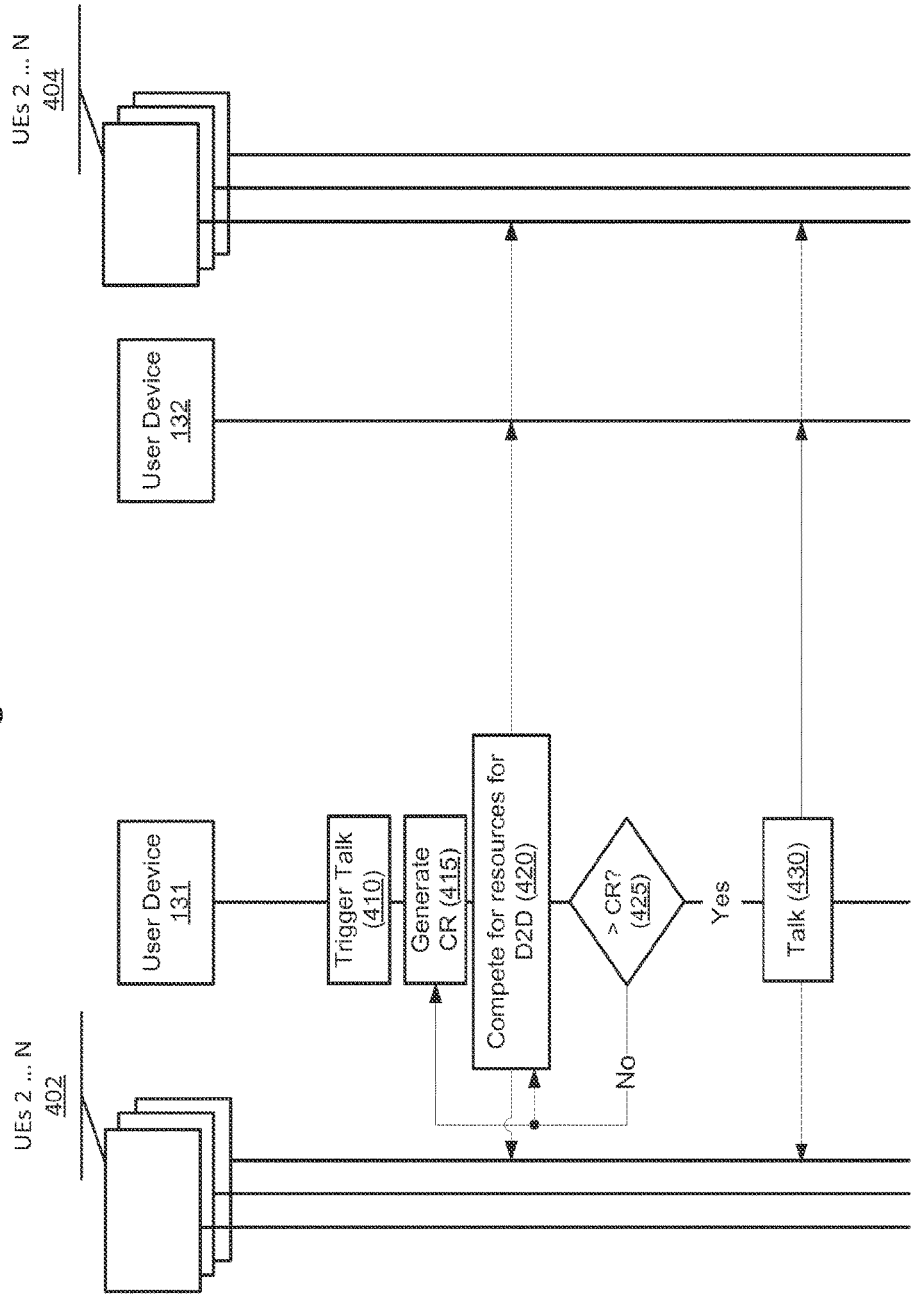
FIG. 4 is a diagram illustrating a technique for D2D communication according to at least one example implementation.

FIG. 4 is a diagram illustrating a technique for device-to-device (D2D) communication according to at least one example implementation. In this example implementation, there is no base station or cluster head to allocate resources (e.g., wireless channel(s)) for use by the various user groups. Such resource or channel access without a base station may be referred to as mode 2 D2D transmission, mode 2 communication and/or communicating in mode 2. In mode 2 communication, allocation of resources may be negotiated (e.g., each UE requests its own resources) between user devices such that contention of the resources is minimized or reduced. As shown in FIG. 4, signals, messages and/or data are communicated between one or more of a user device (UE) 131, 132, and a plurality of user device (UEs) 402, 404. According to example embodiments, the communication of signals, messages and/or data may be described as controlling the sending of a signals, messages and/or data by a controller of a first device (e.g., UE 131) to a second device (e.g., UE 132). The second device then controls the receiving of the signal (message or data) by a controller of the second device.

In an example implementation, a trigger to talk (block 410) may be initiated by UE 131. However, other events may also trigger communications (e.g., sending a text message). The trigger to talk may be initiated by depressing a button on the UE 131. However, other actions may cause a trigger to talk. For example, interaction with a touch screen of the UE 131 to select a receiving UE or group of UE's followed bay selecting a call user interface on the touch screen may initiate a trigger to talk. The UE 131 then generates a random number for contention resolution (CR). CR may be a random number within a range (e.g., 1-800, 200-300, 801-805, and the like). A range may be assigned (e.g., previously configured) to a user device (e.g., UE 131) based on a user device priority. User device priority may be based on a user (or type of user) of the user device. For example, a higher priority may be assigned to an emergency responder (e.g., Fire Chief, Police Chief, and the like) as compared to a normal user (e.g., civilian user). For example, a user device associated with an emergency responder may be assigned a range of 801 to 810, whereas a normal user may be assigned a range of 1 to 800. In another example, ranges may be assigned based on a quality of service. For example, users may be offered a more expensive service plan (for D2D communications) and assigned a range of 601 to 800, whereas a less expensive service plan may be assigned a range of 1 to 201. Other ranges, user types and priorities are within the scope of this disclosure. In other words, using range assignments, users and/or groups of users can be differentiated (e.g., economically, priority, organizationally, and the like) within D2D communications.

The UE 131 then competes for resources for D2D communication (block 420). For example, the UE 131 communicates or controls a communication (e.g., transmits or sends) one or more repeated SAs in the SA period (e.g., as described in FIG. 2) before each data period. The SA period may include at least one subframe and each UE may send its SA in the at least one subframe in a random (or pseudo random) manner. In the at least one subframe that a UE does not communicate in, the UE may listen, monitor, or read other UEs SAs. Therefore, the UE may be aware of the used resources and CRs from other UEs.

Alternatively, or in addition, the UE monitors, receives or reads scheduling assignments (e.g., signals, messages or packets) communicated (e.g., from other UE's vying for resources) over a D2D control channel or D2D Scheduling Assignment (SA) channel during one or more contention resolution opportunities (CRO) within a SA period or a talk time allocation period. If the D2D control channel is free (e.g., minimal or no traffic) the UE 131 broadcasts its own SA (including a CR) over the D2D control channel. If the D2D control channel is busy (e.g., traffic above a threshold value) the UE 131 compares its CR value to the value of CRs in SA's received over the D2D control channel. If the UE 131 CR value is less than any of received CR values which indicate the same resource for data transmission, the UE 131 holds and does not communicate over the D2D control channel. If the UE 131 CR value is greater than any of the other CR values, the UE 131 may communicate a SA (including a CR) over the D2D control channel.

If after the last of the one or more CRO for the talk time allocation period the CR value for UE 131 is the greatest CR value, the UE 131 wins the contention resolution and self allocates the requested resources. Finally, the UE 131 talks (block 430) using the allocated timeslot and the assigned resources (e.g., channel). In FIG. 4, UE 131 talks with UE 132 (as illustrated by the solid line). However, UE 132 may talk to a plurality of UE's (including UEs 402, 404) as a broadcast communication (as illustrated by the dotted/dashed lines). Talking may include sending a message including a data packet. The data packet may include voice data or any other type of data (e.g., an image or text). Talking may also include receiving the message (targeted or broadcast) by another user device (e.g., UE 132).

If after the last of the one or more CRO for the talk time allocation period the CR value for UE 131 is not the greatest CR value, the UE 131 loses the contention resolution and does not self allocate (or inhibits the allocation of) the requested resources. In other words, the time-frequency resources requested by the UE 131 overlap with the resources of another UE and UE 131 does not self allocate the time-frequency resources. Processing for UE 131 then returns to block 415 where a new CR value is generated. Alternatively, processing returns to block 420 and uses the same CR value. According to example embodiments, an inhibited D2D communication will eventually have the largest CR value and self assign the requested resources. Using the techniques described with regard to FIG. 4 D2D resource assignment conflicts may be minimized when there is no schedule assignment by a central controller such as base station or cluster head.

In an alternate embodiment, if the UE loses and there are no SA transmissions remaining, the UE can determine if the SA period was "busy" (e.g., a number of transmissions above a threshold number). If the SA period was not "busy" the UE can choose data resources which have not been communicated in any SA for communication. If the SA period was "busy", the UE may inhibit communication (and wait for a next data period).

Figure 5:
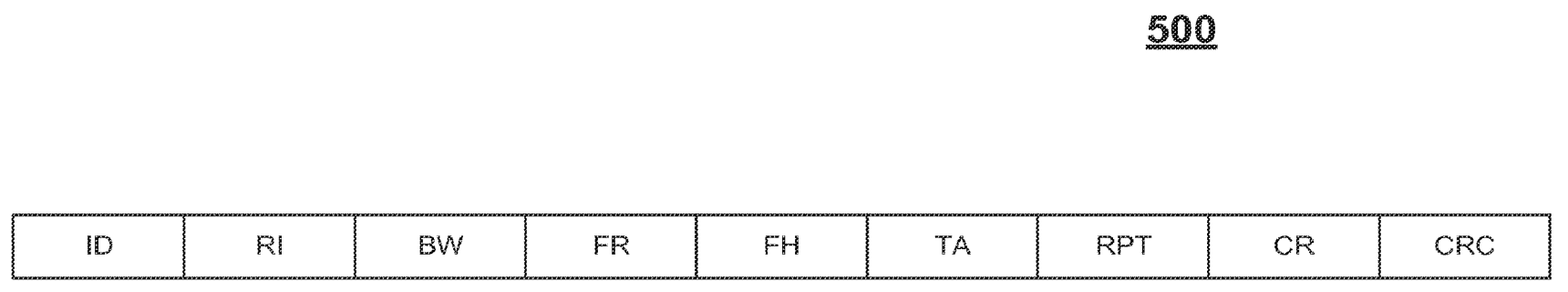

FIG. 5 is a block diagram of a scheduling assignment (SA) packet according to at least one example implementation. The SA packet 500 may be an element of a message, a signal, a block of data and/or the like. The SA packet 500 may include D2D Communication Mode indication (to indicate mode 1 or 2), the randomly generated CR value, an identification (ID), a resource information (RI), a bandwidth of data (BW), a frequency resource of data (FR), a frequency hopping of data (FH), a timing advance of data (TA), a resource pattern of transmission (RPT), and a cyclic redundancy check (CRC). Each of these (other than the CR) is not necessarily present in the SA packet 500. Further, other information and/or settings may also be included in the SA packet 500.

The ID can be a single or multi bit field which identifies the user device. The RI can be a single or multi bit field which includes information for transmission of multiple media access control (MAC) protocol data units (PDU). The BW can be a single or multi bit field which identifies the frequency bandwidth and duplexing type. The FR can be a single or multi bit field which identifies the operating or frequency band over which to transmit the data, voice and the like. The FH can be a single or multi bit field which identifies whether or not hopping is used to map resource blocks and if so what type of hopping to use. The TA can be a single or multi bit field which indicates an amount of timing delay between user devices based on path loss between the user devices. The RPT can be a single or multi bit field which may define the pattern to map data or resource blocks to carriers or subcarriers for wireless transmission. The CRC can be a single or multi bit field which is used for error detection.

FIGS. 7A, 7B and 7C are tables illustrating time periods (e.g., SA period and data period) for resource assignment according to at least one example implementation. The tables illustrate three user devices UE1, UE2, UE3 and a Fire Chief (FIGS. 7A and 7B) vying for resources over two time periods Talk 1, Talk 2 each including a SA period and a data period as discussed above with regard to FIG. 2. Each SA period includes three contention resolution opportunities CRO1, CRO2, CRO3.

As shown in each table during CRO1 UE1 and UE3 communicate a SA (SA1 and SA3 respectively). SA1 associated with UE1 during Talk 1 has a (randomly generated) CR value of 768. SA3 associated with UE3 during Talk 1 has a (randomly generated) CR value of 100. According to example embodiments, UE3 inhibits communication (e.g., no longer contends for resources) during Talk 1 because UE3's CR value (100) is less than UE1's CR value (768). As shown in the table of FIG. 7A, during CRO2 UE1 and UE2 communicate a SA (SA1 and SA2 respectively). SA2 associated with UE2 during Talk 1 has a (randomly generated) CR value of 500. According to example embodiments, UE2 inhibits communication (e.g., no longer contends for resources) during Talk 1 because UE2's CR value (500) is less than UE1's CR value (768). During CRO3 UE1 communicates an SA, but UE2 and UE3 do not because UE1 and UE3 have inhibited communication during the Talk 1 time period. Accordingly, UE1 self allocates the resources during the Talk 1 time period and starts talking. A similar sequence of events lead to UE3 self allocating resources during the Talk 2 time period of FIG. 7A.

FIGS. 7B and 7C introduce the Fire Chief as a high priority user. In FIG. 7B, the Fire Chief generates (e.g., randomly generates) a CR value in, for example, a [801-810] range and is shown as having generated a CR value of 801 as communicated during CRO2 of the Talk 1 time period. Alternatively, the Fire Chief can have a fixed or preconfigured CR value shown as, for example, a CR value of 801. Fire Chief self allocates the resources during the Talk 1 time period and starts talking because 801 is greater than 768 (UE1) and greater than 100 (UE3). The Talk 2 time period of FIG. 7B is similar to the Talk 2 time period of FIG. 7A where UE3 self allocates the resources during the Talk 2 time period and starts talking because 701 is greater than 600 (UE2) and greater than 352 (UE1). During the Talk 2 time period of FIG. 7B, the Fire Chief does not contend for resources.

High priority handling can be as linear as selecting (or preconfiguring) a priority value based on the user of the user device. For example, where the Fire Chief is set to 801, the Fire chief's boss can be assigned priority 802, so different levels of priority handling can be also supported. Then for the regular user devices, the range for random number is [0-800], so priority calls are supported. It is shown in the first figure below. FIG. 7C illustrates using a dedicated SA resource (e.g., D2D control channel) for high priority calls (e.g., illustrated as SA-HP). Having a dedicated SA resource may minimize D2D control channel contention during contention resolution opportunities. FIGS. 7A, 7B and 7C also illustrate silence timeblocks where no (or unrelated) D2D communication is conducted.

Before data transmission, a user device may transmit a randomly generated number in a contention resolution field in the scheduling assignment. A user device reads the contention resolution fields of SAs from other user devices (if any). A user device is inhibited from transmitting the data if its assumed priority is lower than that of another UE and the data resource (or time-frequency resource) is overlapped. High priority users (e.g., an emergency responder like a fire chief) may be configured with a high priority number.

As there is no central controller (e.g., base station or cluster head) in communication Mode 2, in a self-regulated contention resolution, the SA is used for both scheduling and access control. In a first example implementation, a regular user device can transmit a SA in the scheduling assignment period preceding the data period when the user device is triggered to talk. In a second example implementation, the user device further monitors the SA resources and transmit a SA when the user device determines that the SA resources are idle or free. The idle state or free status of the channel is determined by no or only a few detections of a valid SA in the SA resource pool. Additional implementation specific technique such as power detection can be used on the top of that (e.g., to handle the situation two user devices send colliding SAs and the third UE does not decode a valid SA on the colliding location).

The user device then transmits a randomly generated number for the contention resolution (CR) field (e.g., a new field in the SA). In an example implementation, the user device can change the content of the content resolution (CR) field for each transmission. In other words, the random number is generated for each SA period, hence random number can be different from one SA period to another SA period. In another example implementation, the user device does not change the content of the contention resolution field for SA transmissions other than the first one.

The range of the random numbers may be configured or signaled (e.g., as part of a join process) for the user device (e.g. between [0:800], 0 being the lowest priority, 800 being the highest priority). The priority of a user device is held constant for the life time of a call. A high priority user device (e.g. user device of a fire chief) is assumed a fixed value for the contention resolution field. And it is allowed to transmit a SA when the channel is not occupied by an even higher priority user device or idle. The priority of a user device is made visible through the contention resolution (CR) field's content. For example, set in an ascending order, [0:800] can be set for a regular UE, [801:803] or a single value 802 can be set for the high priority user device.

A user device reads the contention resolution fields of SAs from other user devices (if any). A user device is inhibited from transmitting the data if the resource (e.g., time-frequency resource) indicated for the data is the same (e.g., overlapped) as that of another UE and it has a lower priority than that the another user device.

Figure 8:
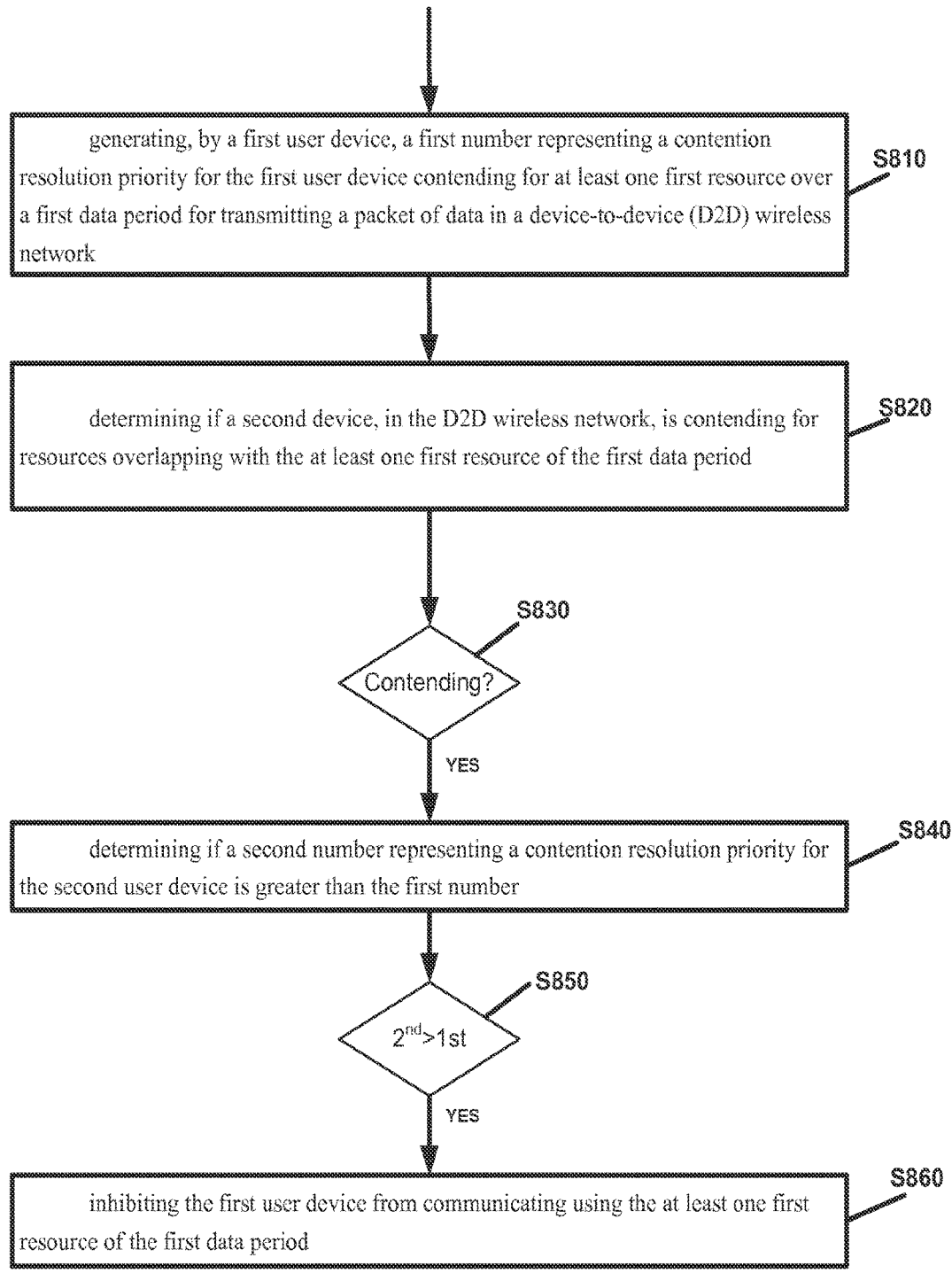
FIGS. 8, 9 and 10 are flow charts illustrating operation of a device according to at least one example implementation.
Figure 9:
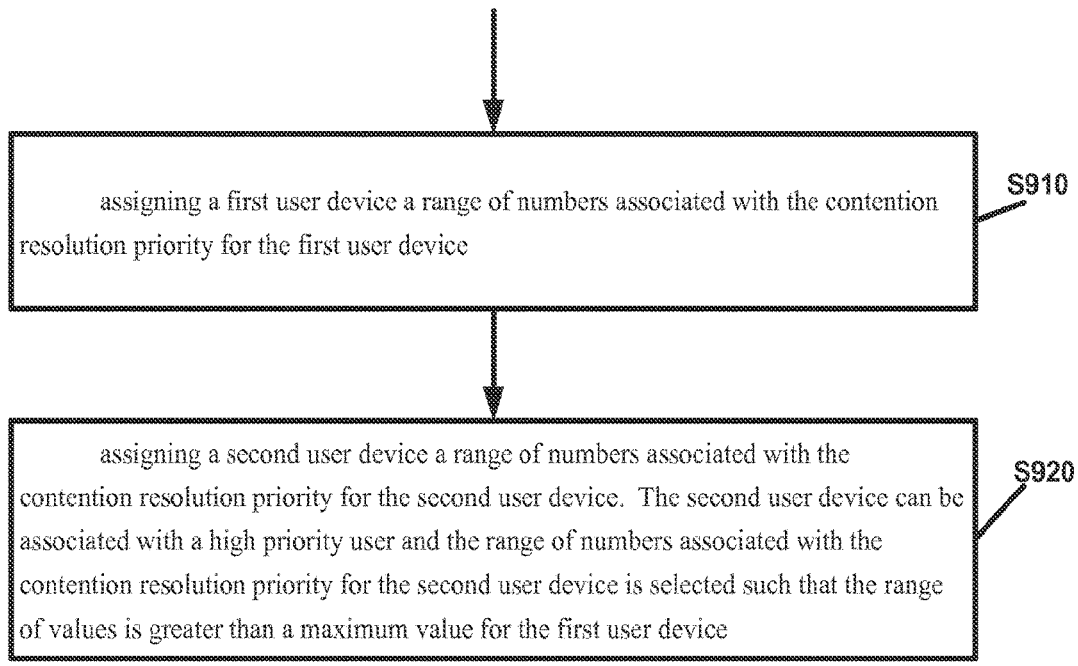
Figure 10:
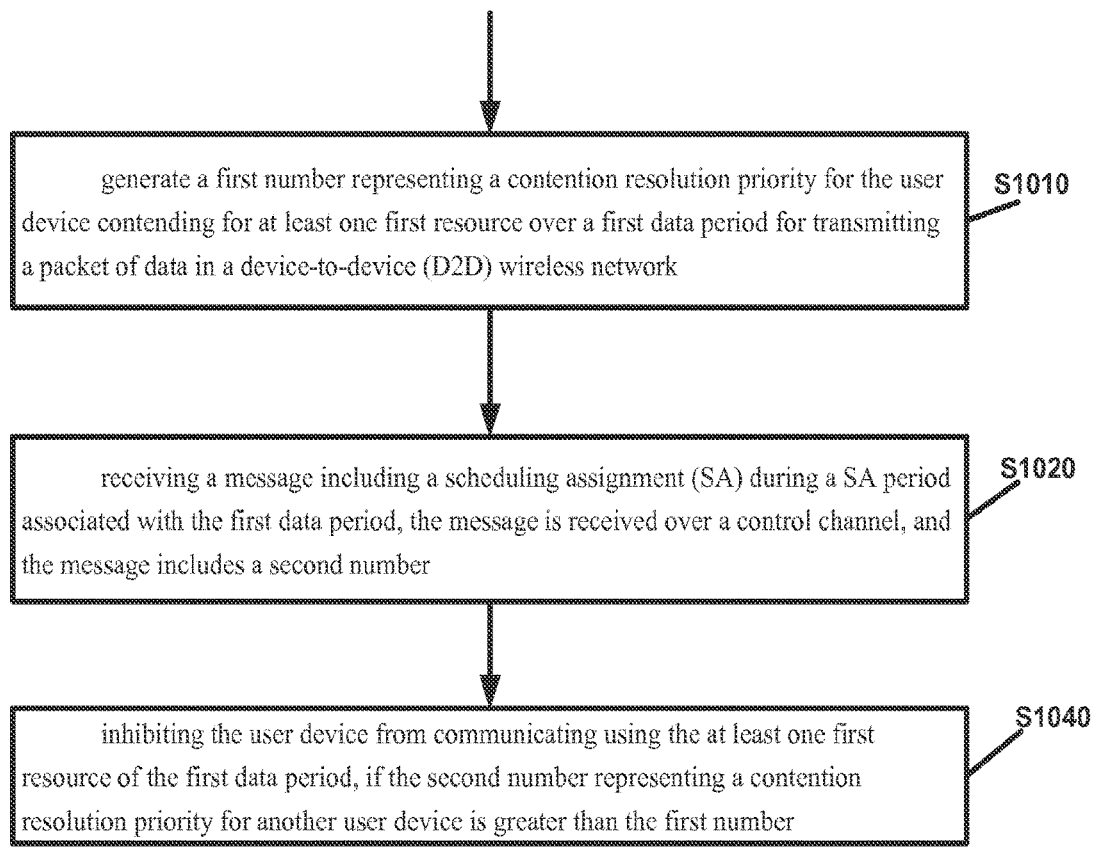

FIGS. 8, 9 and 10 are a flow charts illustrating operation of a device according to at least one example implementation. The steps described with regard to FIGS. 8, 9 and 10 may be performed due to the execution of software code stored in a memory associated with an apparatus (e.g., a user device) and executed by at least one processor associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 8, 9 and 10.

FIG. 8 is a flow chart illustrating operation of a device according to at least one example implementation. As shown in FIG. 8 a first user device generates (or controls the generating of) a first number representing a contention resolution priority for the first user device contending for at least one first resource over a first data period for transmitting a packet of data in a device-to-device (D2D) wireless network (S810). Then the user device determines (or controls the determining of) if a second device, in the D2D wireless network, is contending for resources overlapping with the at least one first resource of the first data period (S820). If the second device is contending for resources overlapping with the at least one first resource of the first data period (S830), the user device determines (or controls the determining of) if a second number representing a contention resolution priority for the second user device is greater than the first number (S840). If the second number is greater than the first number (S850), the user device inhibits (or controls the inhibiting of) the first user device from communicating using the at least one first resource of the first data period (S860).

FIG. 9 is a flow chart illustrating operation of a device according to at least one example implementation. As shown in FIG. 9, a first user device is assigned a range of numbers associated with the contention resolution priority for the first user device (S910). Further, second user device is assigned a range of numbers associated with the contention resolution priority for the second user device. The second user device can be associated with a high priority user and the range of numbers associated with the contention resolution priority for the second user device is selected such that the range of values is greater than a maximum value for the first user device (S910).

FIG. 10 is a flow chart illustrating operation of a device according to at least one example implementation. As shown in FIG. 10, a user device generates (or controls the generating of) a first number representing a contention resolution priority for the user device contending for at least one first resource over a first data period for transmitting a packet of data in a device-to-device (D2D) wireless network (S1010). The user device receives (or controls the receiving of) a message including a scheduling assignment (SA) during a SA period associated with the first data period, the message can be received over a control channel and the message includes a second number (S1020). The user device inhibits (or controls the inhibiting of) the user device from communicating using the at least one first resource of the first data period, if a second number representing a contention resolution priority for another user device is greater than the first number and the indicated resources are overlap.

These and other aspects can include one or more of the following features. For example, the steps may further include assigning the first user device a range of numbers associated with the contention resolution priority for the first user device, wherein a value for the first number is randomly selected from the range of numbers. The second user device can be associated with a high priority user and a value for the second number is selected such that the value is greater than a maximum value for the first number.

For example, the determining if the second device is contending for the at least one first resource over the first data period includes receiving a message including a scheduling assignment (SA) during a SA period associated with the first data period, the message is received over a control channel, and the message includes the second number. For example, if the second number is greater than the first number, the steps further include communicating, by the first device during a portion of a SA period associated with the first data period, one of an SA including the first number over a control channel of the D2D wireless network and data over a data channel.

For example, the first data period can be associated with at least one portion of a SA period reserved for contention resolution opportunities (CRO), and determining if the second device is contending for resources over the first data period includes receiving a message including a SA during one of the at least one portion of a SA period reserved for CRO, the message including the second number. The first data period can be associated with at least one portion of a SA period reserved for CRO, and if, during a first of the at least one portion of the SA period reserved for CRO, the first user device determines the second number is less than the first number, the first user device can communicate a message including the first number using an SA during a second of the at least one portion of the SA period reserved for CRO.

For example, the inhibiting of the first user device from communicating over the first data period can include one or more of preventing the first user device from communicating an SA over a control channel of the D2D wireless network during a SA period associated with the first data period, and preventing the first user device from communicating data over a data channel of the D2D wireless network during the first data period. For example, the D2D network can include a plurality of user devices, each of the plurality of user devices being associated with a priority user such that a user device associated with a low priority user is configured to select a number representing a contention resolution priority from a first range of numbers and a user device associated with a high priority user is configured to select a number representing a contention resolution priority from a second range of numbers, the first range of numbers includes values less than the second range of numbers, and the first range of numbers includes values exclusive of the second range of numbers. Example embodiments can include means for carrying out any of the steps described above. Example embodiments can include a computer program product for a computer, including software code portions for performing any of the steps described above.

Figure 11:
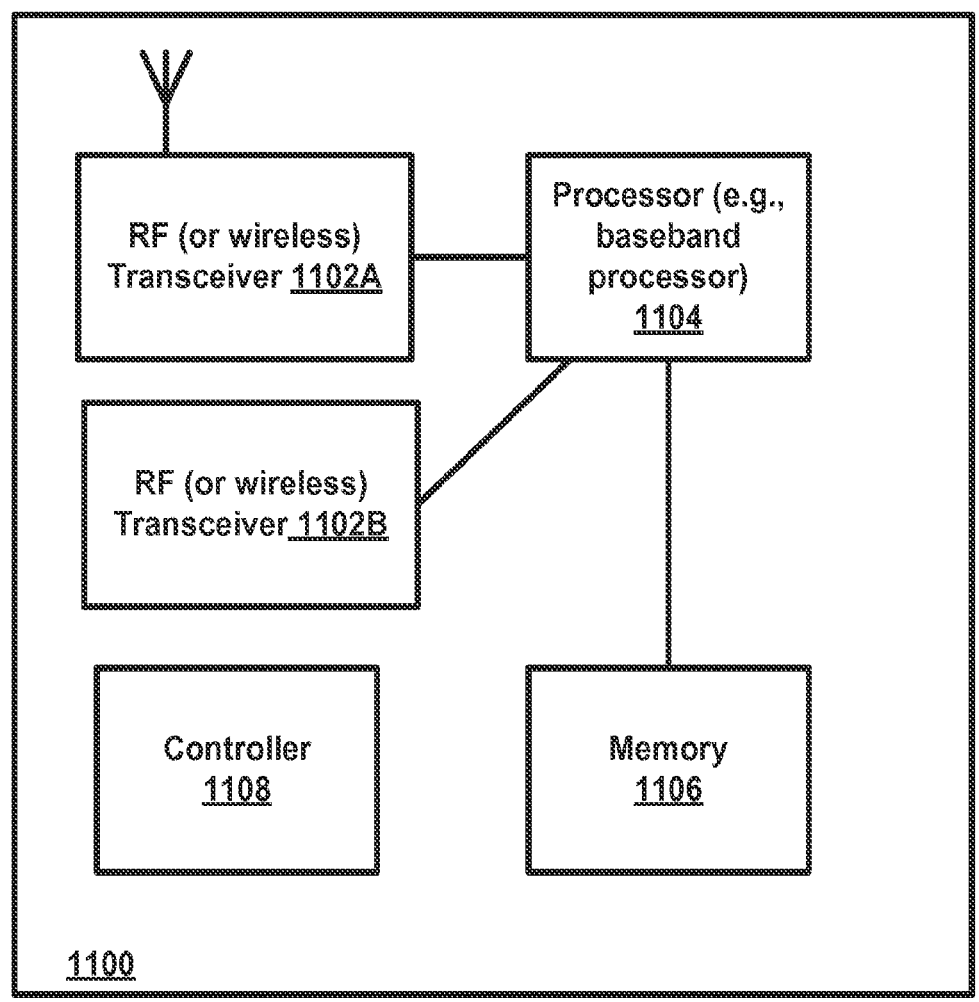
FIG. 11 is a block diagram of a wireless device (e.g., user device, BS or other wireless device) according to at least one example implementation.

FIG. 11 is a block diagram of a wireless station (e.g., BS or user device) 1100 according to an example implementation. The wireless station 1100 may include, for example, two RF (radio frequency) or wireless transceivers 1102A, 1102B, where each wireless transceiver includes a transmitter to transmit signals and a receiver to receive signals. The wireless station also includes a processor or control unit/entity (controller) 1104 to execute instructions or software and control transmission and receptions of signals, and a memory 1106 to store data and/or instructions.

Processor 1104 may also make decisions or determinations, generate frames, packets or messages for transmission, decode received frames or messages for further processing, and other tasks or functions described herein. Processor 1104, which may be a baseband processor, for example, may generate messages, packets, frames or other signals for transmission via wireless transceiver 1102. Processor 1104 may control transmission of signals or messages over a wireless network, and may control the reception of signals or messages, etc., via a wireless network (e.g., after being down-converted by wireless transceiver 1102, for example). Processor 1104 may be programmable and capable of executing software or other instructions stored in memory or on other computer media to perform the various tasks and functions described above, such as one or more of the tasks or methods described above. Processor 1104 may be (or may include), for example, hardware, programmable logic, a programmable processor that executes software or firmware, and/or any combination of these. Using other terminology, processor 1104 and transceiver 1102 together may be considered as a wireless transmitter/receiver system, for example.

In addition, referring to FIG. 11, a controller (or processor) 1108 may execute software and instructions, and may provide overall control for the station 1100, and may provide control for other systems not shown in FIG. 11, such as controlling input/output devices (e.g., display, keypad), and/or may execute software for one or more applications that may be provided on wireless station 1100, such as, for example, an email program, audio/video applications, a word processor, a Voice over IP application, or other application or software.

In addition, a storage medium may be provided that includes stored instructions, which when executed by a controller or processor may result in the processor 1104, or other controller or processor, performing one or more of the functions or tasks described above.

According to another example implementation, RF or wireless transceiver (s) 1102A/1102B may receive signals or data and/or transmit or send signals or data. Processor 1104 may control the RF or wireless transceiver 1102A or 1102B to receive, send, broadcast or transmit signals or data.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

Further more, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
generating, by a first user device, a first number representing a contention resolution priority for the first user device contending for at least one first resource over a first data period for transmitting a packet of data in a device-to-device (D2D) wireless network;
determining if a second user device, in the D2D wireless network, is contending for resources overlapping with the at least one first resource of the first data period, wherein the determining includes:
receiving a message over a control channel including a scheduling assignment (SA) during a SA period associated with the first data period, wherein the message includes a second number representing a contention resolution priority for the second user device;
if the second user device is contending for resources overlapping with the at least one first resource of the first data period, determining if the second number is greater than the first number; and
if the second number is greater than the first number, inhibiting the first user device from communicating using the at least one first resource of the first data period.

2. The method of claim 1, further comprising:
assigning the first user device a range of numbers associated with the contention resolution priority for the first user device, wherein a value for the first number is randomly selected from the range of numbers.

3. The method according to claim 1, wherein:
the second user device is associated with a high priority user; and
a value for the second number is selected such that the value is greater than a maximum value for the first number.

4. The method according to claim 1, wherein if the second number is greater than the first number, the method further comprises:
communicating, by the first user device during a portion of a SA period associated with the first data period, one of an SA including the first number over a control channel of the D2D wireless network and data over a data channel.

5. The method according to claim 1, wherein:
the first data period is associated with at least one portion of a SA period reserved for contention resolution opportunities (CRO), and
determining if the second user device is contending for resources over the first data period includes receiving a message including a SA during one of the at least one portion of a SA period reserved for CRO, the message including the second number.

6. The method according to claim 1, wherein:
the first data period is associated with at least one portion of a SA period reserved for CRO, and
if, during a first of the at least one portion of the SA period reserved for CRO, the first user device determines the second number is less than the first number, the first user device communicates a message including the first number using an SA during a second of the at least one portion of the SA period reserved for CRO.

7. The method according to claim 1, wherein the inhibiting of the first user device from communicating over the first data period includes one or more of:
preventing the first user device from communicating an SA over a control channel of the D2D wireless network during a SA period associated with the first data period, and preventing the first user device from communicating data over a data channel of the D2D wireless network during the first data period.

8. The method according to claim 1, wherein:
the D2D network includes a plurality of user devices,
each of the plurality of user devices being associated with a priority user such that a user device associated with a low priority user is configured to select a number representing a contention resolution priority from a first range of numbers and a user device associated with a high priority user is configured to select a number representing a contention resolution priority from a second range of numbers,
the first range of numbers includes values less than the second range of numbers, and
the first range of numbers includes values exclusive of the second range of numbers.

9. A computer program product for a computer, comprising software code portions for performing the steps of claim 1 when said product is run on the computer.

10. A first user device comprising at least one processor and at least one memory including computer instructions, when executed by the at least one processor, cause the first user device to:
generate a first number representing a contention resolution priority for a first user device contending for at least one first resource over a first data period for transmitting a packet of data in a device-to-device (D2D) wireless network;
determine if a second user device, in the D2D wireless network, is contending for resources overlapping with the at least one first resource of the first data period, including causing the first user device to receive a message over a control channel including a scheduling assignment (SA) during a SA period associated with the first data period, wherein the message includes a second number representing a contention resolution priority for the second user device;
if the second user device is contending for resources overlapping with the at least one first resource of the first data period, determine if the second number is greater than the first number; and
if the second number is greater than the first number, inhibiting the first user device from communicating using the at least one first resource of the first data period.

11. The first user device of claim 10, further comprising:
assigning the first user device a range of numbers associated with the contention resolution priority for the first user device, wherein a value for the first number is randomly selected from the range of numbers.

12. The first user device according to claim 10, wherein:
the second user device is associated with a high priority user; and
a value for the second number is selected such that the value is greater than a maximum value for the first number.

13. The first user device according to claim 10, wherein:
the first data period is associated with at least one portion of a SA period reserved for contention resolution opportunities (CRO), and
determining if the second user device is contending for resources over the first data period includes receiving a message including a SA during one of the at least one portion of a SA period reserved for CRO, the message including the second number.

14. The first user device according to claim 10, wherein the inhibiting of the first user device from communicating over the first data period includes one or more of:
preventing the first user device from communicating an SA over a control channel of the D2D wireless network during a SA period associated with the first data period, and
preventing the first user device from communicating data over a data channel of the D2D wireless network during the first data period.

15. A first user device comprising at least one processor and at least one memory including computer instructions, when executed by the at least one processor, cause the first user device to:
generate a first number representing a contention resolution priority for the first user device contending for at least one first resource over a first data period for transmitting a packet of data in a device-to-device (D2D) wireless network;
receive a message over a control channel including a scheduling assignment (SA) during a SA period associated with the first data period, wherein the message includes a second number representing a contention resolution priority for a second user device; and
inhibit the first user device from communicating using the at least one first resource of the first data period, if the second number is greater than the first number.

16. The user device according to claim 15, wherein the inhibiting of the first user device from communicating over the first data period includes one or more of:
preventing the first user device from communicating an SA over a control channel of the D2D wireless network during a SA period associated with the first data period, and
preventing the first user device from communicating data over a data channel of the D2D wireless network during the first data period.

* * * * *